July 1, 1941.  D. HEYER  2,247,552

MULTIPLE BELT VARIABLE SPEED DRIVE SYSTEM

Filed Nov. 12, 1934  8 Sheets-Sheet 1

Don. Heyer INVENTOR

BY John Flam
ATTORNEY

July 1, 1941.   D. HEYER   2,247,552
MULTIPLE BELT VARIABLE SPEED DRIVE SYSTEM
Filed Nov. 12, 1934   8 Sheets-Sheet 2

Don Heyer INVENTOR
BY John Flam
ATTORNEY

July 1, 1941.　　　　D. HEYER　　　　2,247,552
MULTIPLE BELT VARIABLE SPEED DRIVE SYSTEM
Filed Nov. 12, 1934　　　8 Sheets-Sheet 3

Don Heyer INVENTOR
BY John Flann
ATTORNEY

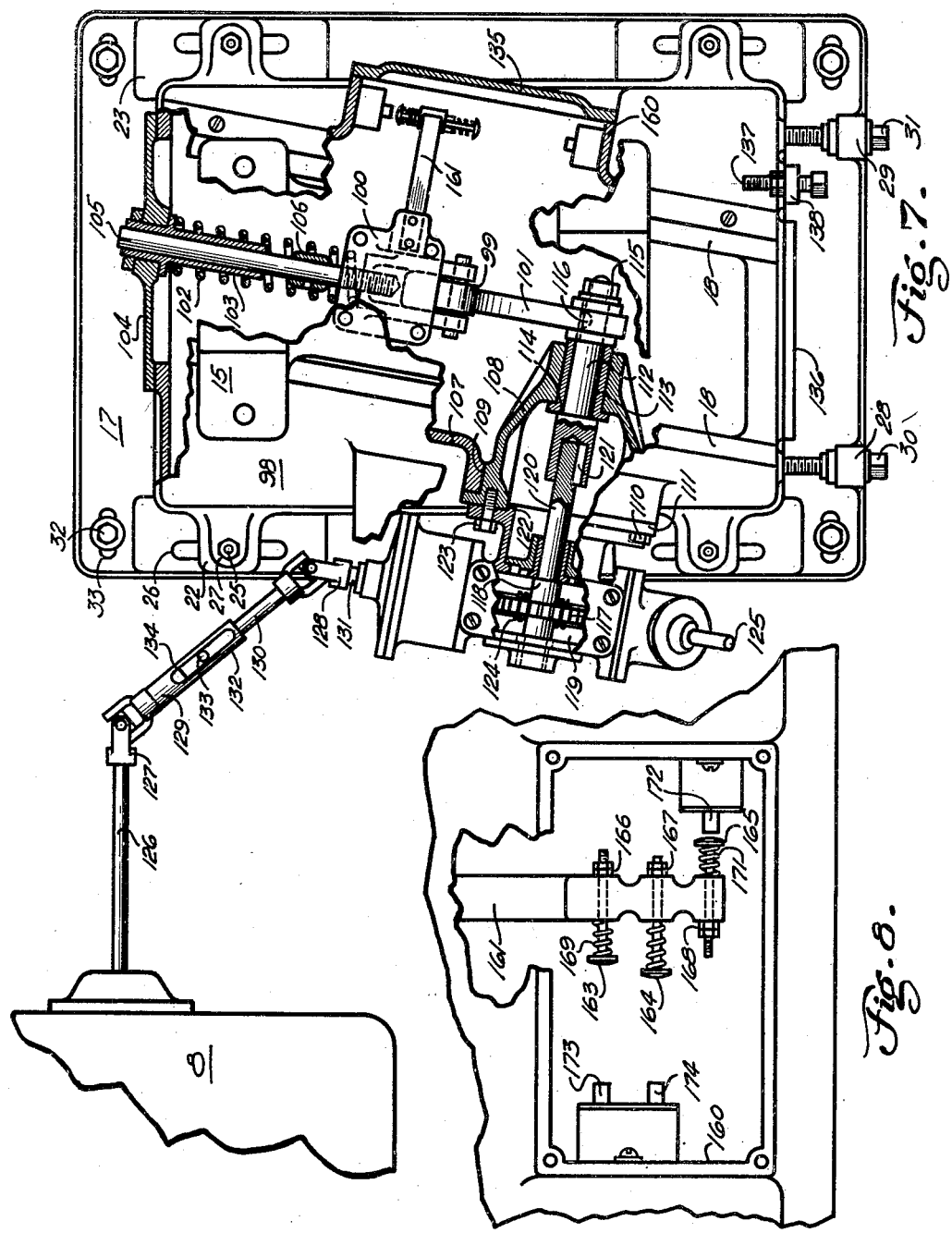

July 1, 1941.   D. HEYER   2,247,552
MULTIPLE BELT VARIABLE SPEED DRIVE SYSTEM
Filed Nov. 12, 1934   8 Sheets-Sheet 5

Don Heyer INVENTOR
BY John Flam
ATTORNEY

Don Heyer. INVENTOR
BY John Flann
ATTORNEY

July 1, 1941. D. HEYER 2,247,552
MULTIPLE BELT VARIABLE SPEED DRIVE SYSTEM
Filed Nov. 12, 1934 8 Sheets-Sheet 8

Don Heyer INVENTOR
BY John Flam
ATTORNEY

Patented July 1, 1941

2,247,552

UNITED STATES PATENT OFFICE 2,247,552

MULTIPLE BELT VARIABLE SPEED DRIVE SYSTEM

Don Heyer, Los Angeles, Calif., assignor to U. S. Electrical Motors, Inc., a corporation of California Application November 12, 1934, Serial No. 752,657

12 Claims. (Cl. 74—230.17)

This invention relates to a source of variable speed power for driving machines which operate under varying load conditions and more particularly to an integral construction incorporating a driving electric motor and a variable speed ratio transmission.

In this invention the source of variable speed power includes an electric motor in driving relation to a driving pulley structure, a driven structure in driving relation to a load driving shaft and a belt for transmitting power from the driving pulley structure to the driven pulley structure, at least one of the pulley structures having an adjustable effective diameter, whereby the variation in speed ratio is obtained.

Such an adjustable pulley structure may include a pair of pulley sections having opposed inclined faces forming a seat for a wedge shaped driving belt. In order to provide means for adjusting the effective diameter of the pulley structure the sections are made relatively axially adjustable. In this way the inclined faces can be brought together forcing the belt to be urged radially outward to produce an increased effective diameter; or they can be separated causing the belt to be in contact with the inclined faces at a shorter radial distance to produce a decreased effective diameter.

The variable speed drive may have two adjustable pulley structures or it may include one adjustable pulley structure, and one pulley having a fixed effective diameter. Where only one adjustable pulley structure is employed the belt may be maintained in active driving relation to the pulleys by adjusting the center distance between the axes of the two pulley structures in accordance with the adjustment of the adjustable diameter pulley structure. When two adjustable pulley structures are employed the pulleys are arranged to be oppositely adjusted; that is, an increase in the effective diameter of one of the pulley structures is accompanied by a compensating decrease in the effective diameter of the other pulley structure.

In many variable speed power applications the speed required at the load driving shaft is much less than that provided at the driving shaft of the motor. This reduction in speed between the driving motor shaft and the load driving shaft may be obtained by employing reduction gearing between the driven shaft of the adjustable ratio transmission and the load driving shaft; or the driven pulley structure of the adjustable ratio transmission may be mounted directly on the load driving shaft and the reduction in speed may be obtained by the use of appropriate diameters for the driving and driven pulleys.

In this invention one of the pulley structures may be mounted on the motor shaft, and the other pulley structure may be mounted on the load driving shaft, which is in active driving relation to the driven load. The diameter of the driven pulley structure is thus directly determined by the diameter of the driving pulley structure and the reduction in speed which is required between the driving electric motor and the load driving shaft. Thus where a large reduction in speed is required the diameter of the driven pulley structure is much greater than that of the driving pulley structure.

The variation in the effective radius which may be obtained by the use of an adjustable diameter pulley structure is determined by the practical width of the belt, the belt velocity and the diameter of the pulley structures over which the belt may be operated. Where two adjustable pulley structures are employed the variation in the effective radius of the two pulley structures will be substantially equal, however the variation in the radius of the larger pulley structure is less than that of the smaller of the pulley structures. The adjustment of the speed ratio which is effected by the change in radius is, however, also a function of the pulley diameter, thus for a given change in the effective radius a much greater adjustment of the speed ratio is obtained with a small diameter pulley structure than that which is obtained with a large diameter pulley structure. Consequently when two pulley structures of unequal diameters are employed no great increase in the variation in speed ratio of the shafts is obtained by adjusting the effective diameter of the larger of the pulley structures.

It is accordingly one of the objects of this invention to provide an adjustable speed drive, which may provide a large reduction in speed between the driving shaft and the load driving shaft and in which only the smaller of the pulley structures need be adjusted.

The minimum effective diameter of the adjustable pulley structure is determined by the minimum diameter over which the belt may be operated at the peripheral velocity corresponding to the effective pulley diameter and the rate of rotation. The maximum effective diameter of the adjustable pulley structure is determined by the thickness and width of the belt and the peripheral velocity at which the belt may be operated without failure of the belt. The variation in effective diameter which may be obtained in any single pulley construction is also determined by the maximum width of the belt which may be used without failure of the belt due to lateral buckling. For if too wide a belt is used the belt will buckle due to the lateral pressure of the pulleys on the belt sides. If it is attempted to increase the thickness of the belt to avoid buckling due to the lateral pressure, the minimum effective diameter over which the belt may be operated will be increased. This effect is accumulative after a certain point. A further increase in belt thickness requires a larger minimum effective diameter, which in order to obtain the required variation in speed ratio requires an increase maximum effective diameter; which in turn requires a thicker and wider belt. Thus where relatively high speed electric motors are employed the maximum variation in speed ratio may be obtained by the use of relatively thin belts which are not of excessive width, and which may be bent over relatively small pulley diameters. Belts of this type, however, do not have an exceedingly large power capacity. Thus in order to obtain drives having an increased power capacity it is necessary to employ several belts in parallel and dividing the load between them.

It is accordingly still another object of this invention to provide an adjustable speed drive having a variable center distance and in which means are provided for employing multiple belt pulleys.

In the construction to be described hereinafter, interlocking means are provided for adjusting the center distance between the axes of the two pulley structures simultaneously with the adjustment of the effective diameter of the adjustable pulley structure. This type of drive in which the center distance between the axes of the two pulley structures and the effective diameter of the adjustable diameter pulley structures are interlockingly adjusted is now well known, being described in my co-pending application Serial No. 732,452 for an Adjustable speed drive.

It is still another object of this invention to provide a multiple belt adjustable speed drive, in which the effective diameter of the adjustable pulley structure and the center distance are interlockingly adjusted.

In the form of the device which is described hereinafter one pulley section of each of the adjustable diameter pulley structures of the multiple belt pulley is fixed with respect to the shaft, and means are provided for adjusting the axial position of the other of the pulley sections with respect to the fixed pulley section. The condition that the belt be maintained in alignment requires that both of the pulley sections of each of the adjustable pulleys be moved in opposite axial directions with respect to the belt. This may be accomplished by moving the shaft and each of the pulley sections secured thereto in one axial direction and the axially movable pulley sections in the opposite axial direction. This adjustment of the center distance and of the axial position of the pulley sections fixed to the motor shaft is accomplished by means of an angular guide for supporting the driving motor and the pulley structures driven thereby. The angle of the guide is so related to the plane in which the belt travels that as the center distance is increased and the effective diameters of the adjustable pulley structures are decreased, the motor shaft and the pulley sections associated therewith are axially withdrawn from the belt to maintain the belt in a fixed axial plane. Interlocking means are then provided for adjusting the positions of the axially adjustable pulley sections to maintain each pair of opposite facing pulley sections in active driving relation to its respective belt. The relative rate at which the members of the adjustable pulley structure and the center distance must be adjusted are a function of the particular pulley diameters, belt length and mounting dimension.

It is accordingly still another object of this invention to provide a multiple belt adjustable speed drive which may be readily adjusted to successfully operate through a wide range of operating requirements.

It is still another object of this invention to provide means for adjusting the variable speed drive to compensate for belt wear or variation in the dimensions of individual belts.

It is still another object of this invention to provide a multiple belt adjustable speed drive in which the belt alignment and belt tension may be quickly and easily adjusted.

In one form of the construction described hereinafter, manual means are provided for adjusting the speed ratio in accordance with the requirements of the driven load. However, in many installations the driven load has a known speed cycle, in which the speed may vary according to time or in accordance with the progress of work through the driven machine. Thus in machines which unwind or wind material on a roll it is often desirable to vary the speed of the roll as the diameter of the roll changes. Or in machines such as spinning mills it is desirable to change the speed of the machine in accordance with the diameter of the roll on which the thread is spun. Or in drives for agitators for chemical plants or for food machinery it is desirable to change the speed of the machine in accordance with the increase in time. The time in which the speed cycle repeats itself may be only a few minutes or it may be several hours.

It is accordingly still another object of this invention to provide an adjustable speed drive in which the speed ratio may be adjusted in accordance with the requirement of the driven machine and which has means for adjusting the speed ratio in accordance with the progress of work through the driven machine.

It is still another object of this invention to provide an adjustable speed drive having means for adjusting the speed ratio at a variable rate in accordance with the requirements of the driven load.

It is still another object of this invention to provide an adjustable speed drive in which adjustment of the speed ratio is actuated in synchronism with the driven load.

In adjustable speed drives in which the duty cycle is of an extended length it is not desirable to continuously adjust the speed ratio; for this would require a large gear reduction between the means actuating the speed ratio adjustment and the means adjusting the speed ratio of the adjustable speed drive.

It is accordingly still another object of this invention to provide an adjustable speed drive in which the speed ratio is intermittently adjusted by increments in accordance with the requirements of the driven load.

In many variable speed drives it is desirable to provide an adjustable speed drive in which the speed ratio is adjusted in accordance with the requirements of the driven load and in which supplementary means are provided for adjusting the speed ratio independent of the driven load.

It is still another object of this invention to provide manual and electro-responsive means for supplementarily adjusting the speed ratio to the value required by the driven load.

This invention possesses many other advantages and has other objects which may be made more easily apparent from a consideration of several embodiments of the invention. For this purpose there are shown several forms in the drawings accompanying and forming a part of the present specification. These forms will now be described in detail which illustrates the general principles of the invention; but it is to be understood that this detailed description is not to be taken in a limiting sense since the scope of the invention is best defined in the appended claims.

Referring to the drawings:

Figure 7 is a plan view of a modified form of the motor supporting structure of Figure 3, and illustrates the speed ratio adjusting mechanism provided in a form of the drive, in which the speed ratio is adjusted in synchronism with the driven load.

Figure 8 is a side elevation of the motor base of Figure 7, as viewed from the right hand side, and illustrates the means provided for actuating the electric control associated with the motor base.

Figure 1:
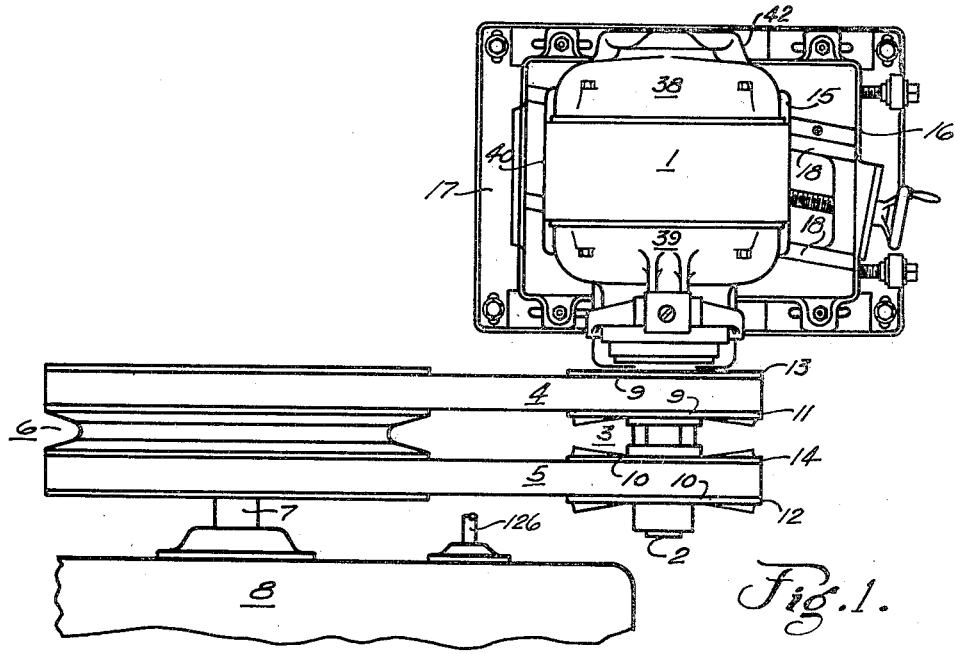
Figure 1 is a plan view of an adjustable speed drive embodying the invention. This view illustrates in general the relation of the driving motor to the driven machine and the members associated with the adjustable ratio transmission.

In the present instance the driving electric motor 1, Figure 1, is provided with a driving shaft 2 having mounted thereon the multiple belt driving pulley structure 3 which by means of belts 4 and 5 drives the driven pulley structure 6, mounted on the load driving shaft 7. The load driving shaft 7 may be directly supported on the frame of the driven machine 8. The driven pulley structure 6 may be of the type commonly employed for flat belt or V belt drives. The driving pulley structure includes the adjustable pulley structures 9 and 10, pulley structure 9 being in driving relation to belt 4 and pulley structure 10 in driving relation to belt 5. The adjustable pulley structures 9 and 10 respectively have the pulley sections 11 and 12 which are secured to the motor shaft and the pulley sections 13 and 14 which are axially movable with respect to the motor shaft.

To provide means for adjusting the center distance between the driving and driven pulley structures the motor 1 is mounted on the sliding motor base 15, which is in turn supported on the sub-base 16, the entire structure being supported on the base plate 17. As the center distance between the driving and driven pulley structures is increased to adjust the speed ratio, the pulley sections 11 and 12 of the driving pulley structure must be axially withdrawn from the belt in one axial direction and the pulley sections 13 and 14 in the opposite axial direction. The pulley sections 11 and 12 are fixed to the motor shaft 2. Thus in order to obtain the required motion of pulley sections 11 and 12, motor 1, together with motor shaft 2 and the pulley sections secured thereto must be provided with adjusting means for obtaining the required axial movement. This motion of the pulley sections 11 and 12 must be so interlocked with the adjustment of the pulley sections 13 and 14 that the two opposite facing pulley sections of each of the adjustable diameter pulley structures 9 and 10 are adjusted oppositely by substantially equal and opposite amounts with respect to the driving belts 4 and 5.

To provide the required axial adjustment of the motor shaft 2 and the pulley sections associated therewith the sub-base 16, which supports the sliding base 15, is provided with an angular guide 18 which engages the sliding motor base and moves it in an axial direction in response to the adjustment of the center distance between the driving and driven pulley structures. Interlocking means, which will be described hereinafter, are then provided for adjusting the axial position of the movable pulley section 13 and 14 to adjust the diameter of the adjustable pulley structures to the value required by the adjusted center distance, the belt width, and the diameter of the driven pulley structure.

Figure 2:
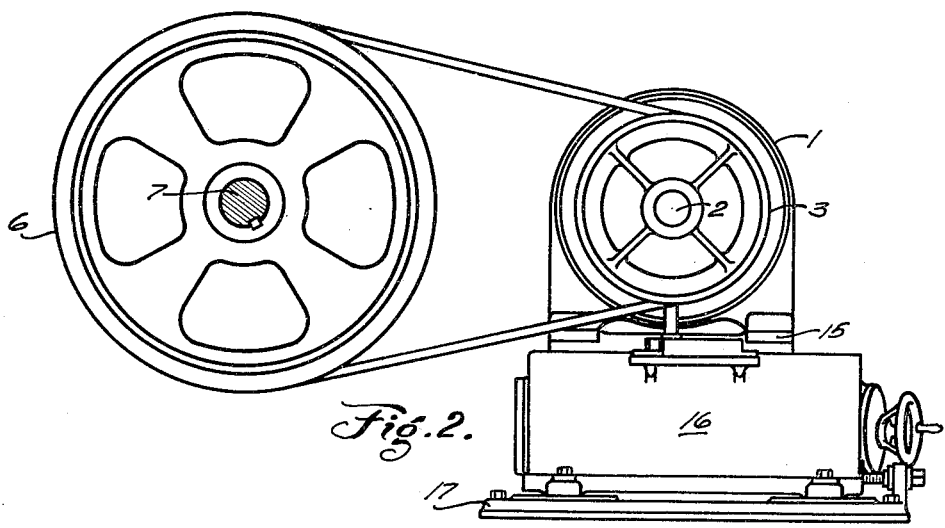
Figure 2 is a side elevation of the adjustable speed drive of Figure 1, as viewed from the pulley end of the motor.
Figure 3:
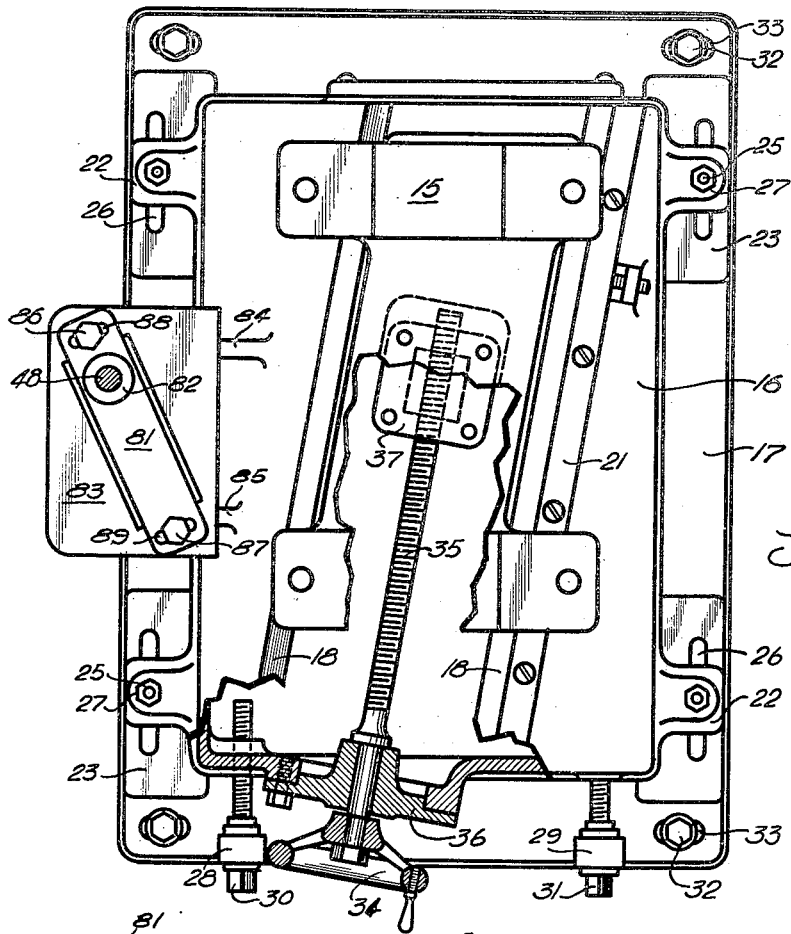
Figure 3 is a plan view of the motor supporting structure of Figure 1, viewed from the right hand side of Figure 1, and with the motor removed.
Figure 4:
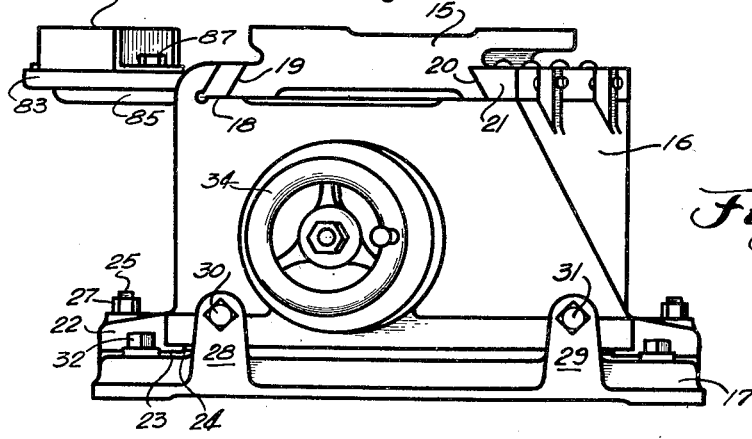
Figure 4 is an end view of the motor supporting structure of Figure 3.

The motor supporting means of Figures 1 and 2 is illustrated in detail by Figures 3 and 4.

Referring to Figure 4: The sliding motor base is provided with tongue members 19 and 20 which engage the angular guide 18 formed on the sub-base 16, the sub-base being provided with the adjustable member 21 for adjusting the sliding clearance between the tongues 19 and 20 and the angular guide 18. The sub-base 16 is in turn provided with feet 22 whereby it is supported on the base plate 17. The base plate is provided with a machined surface 23 for supporting the feet 22 and a shoulder 24 for guiding the movement of the sub-base with respect to the base plate. The sub-base is secured to the base plate by bolts 25 which pass through slots formed in the feet 22 and which are slidably held in grooves 26 formed in the base plate. The sub-base may be secured in any position with respect to the base plate by taking up on nuts 27 which engage the bolts 25.

In order to provide means for adjusting the sub-base with respect to the base plate, the base plate is provided with the extending ears 28 and 29, on which are rotatably supported the lead screws 30 and 31, which threadedly engage the sub-base. Thus the sub-base and the supported motor may be adjusted with respect to the base plate without any change in the effective diameter of the adjustable pulley structure by a rotation of the lead screws 30 and 31, after which, the sub-base may be secured in the adjusted position by tightening up nuts 27. The base plate may be appropriately secured to the foundation by means of bolts 32 which pass through slots 33 formed on the base plate. Slots 33 are formed in a direction parallel to the axis of the shaft of the motor mounted on the sliding base, thus permitting an axial movement of the base plate and the supported motor for the purpose of aligning the driving and driven pulley structures.

Appropriate means may be provided for adjusting the position of the sliding base and the supported motor with respect to the sub-base. In the present instance a lead screw mechanism is provided for this purpose. A hand wheel 34 is suitably secured to lead screw 35, which is rotatably supported on the removable plate 36, and which threadedly engages threaded bushing 37, secured to sliding base 15. If it is desired, means may be provided for securing threaded bushing 37 to the sliding base in a plurality of positions. It is obvious from the construction that the position of the sliding motor base and the supported motor may be adjusted by the rotation of the hand wheel 34 and the associated lead screw 35. The adjusting mechanism also effectively locks the motor base in the adjusted position, as the angle of the lead screw may be made sufficiently small to prevent a force exerted on the motor base from rotating the lead screw and thereby changing the adjustment.

The base plate, the sub-base and the sliding motor base of this construction provide means whereby the driving motor and the driving pulley structure may be adapted to meet widely varying mounting conditions, pulley diameters, center distances and belt widths. To adapt the driving motor to a driven load the base plate may be mounted in the approximate position determined by the belt length and the pulley diameter. The base plate and the supported motor may then be axially adjusted with respect to the driven pulley by means of the slots 33 formed in the base plate. The driving pulley structure may then be adjusted to any desired value by the use of the hand wheel 34 and the associated interlocking mechanism. The sub-base may then be adjusted with respect to the base plate to remove belt slack by the rotation of lead screws 30 and 31, after which, the sub-base may be secured to the base plate by nuts 27. Supplementary means, which are described hereinafter, are also provided with the adjustable pulley structures for adjusting the belt alignment and the belt tension.

The angular relation of guide 18 to the motor axis is determined by the diameters of the driving and driven pulley structures, the center distance and the elevation of the driven pulley structure with respect to the driving pulley structure. As the center distance and the diameter of the driving pulley structure are variable the required angle for the guide is also a variable. However, an intermediate value may be chosen for the guide angle such that the required adjustment may be substantially provided throughout the range of adjustment of the variable speed drive.

The mechanism whereby the motor and the pulley sections secured to the motor shaft are adjusted in accordance with the requirements of the construction have been disclosed. Consider now the means provided for adjusting the position of the pulley sections, which are axially slidable with respect to the motor shaft.

Referring to Figure 1: Motor 1 may be provided with an end bracket 38 which is of the type employed in standard motor construction and which provides a bearing support for one end of the motor shaft and a ventilating aperture 42 for the motor ventilation. The other end of the motor shaft is supported by end bracket 39 which is of special construction; but which may be machined to fit the normal stator dimensions. Brackets 38 and 39 may be secured to the stator 40 by bolts or other suitable means.

Figure 5:
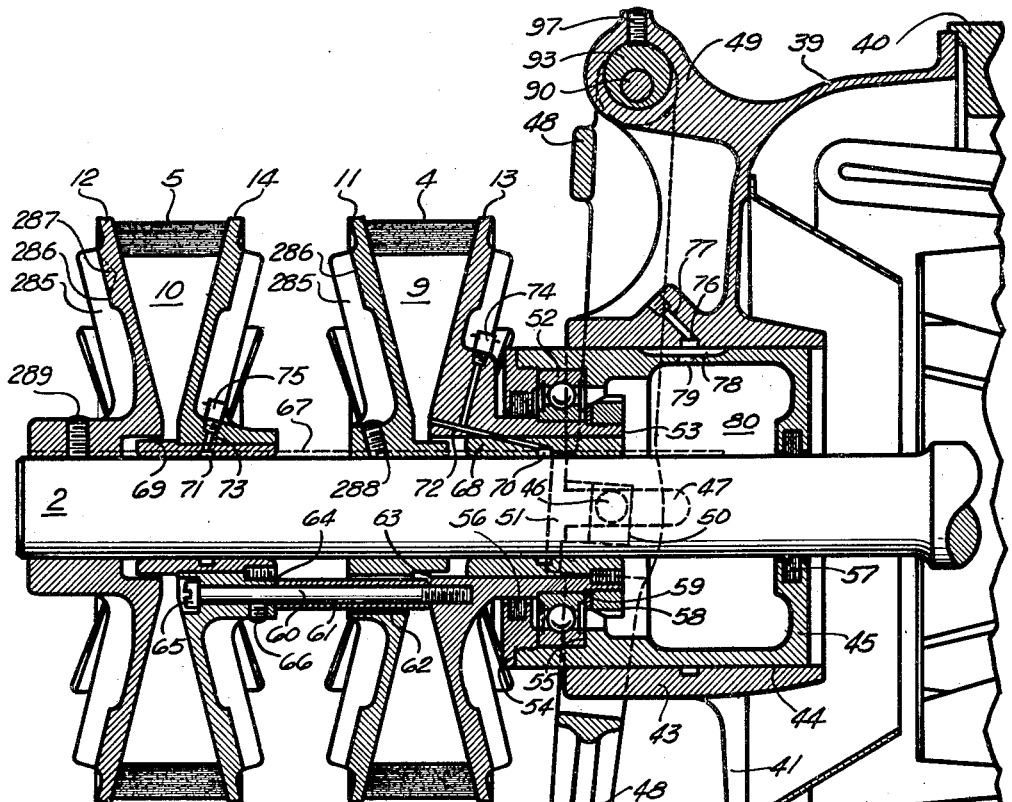
Figure 5 is a sectional view of the multiple belt adjustable pulley structure of Figures 1 and 2, taken in a plane along the axis of the motor shaft.

Figure 5 illustrates in detail the construction of the multiple belt adjustable pulley structure and the motor structure associated therewith. Referring to Figure 5: Special end bracket 39 is provided with a ventilating aperture 41, and has formed thereon a control housing member 43, which is provided with an internal cylindrical bore 44 formed co-axial with the motor shaft, and which slidably supports the adjustable bearing housing 45. Bearing housing 45 is provided with two oppositely placed radially projecting pins 46, shown dotted, which engage axially extending slots 47 formed in the control housing member 43. The engagement of pins 46 with slots 47 thus prevent the rotation of the bearing housing with respect to the control housing but permit axial movement thereof.

The axial position of bearing housing 45 is adjusted by means of lever arm 48, which encircles control housing 43 and engages pins 46, and which is pivotally supported on extending arm 49, formed on the special end bracket 39. The lever arm 48 has formed thereon slots 50 which engages the radially projecting pins 46, one side of the slots 50 being formed by the removable member 51, whereby it is possible to secure the radial pins 46 to the bearing housing 45 prior to the assembly of the driving motor.

It is obvious from the construction that a pivotal movement of lever arm 48 about the pivot formed on arm 49 results in an axial movement of radial pins 46 and the associated bearing housing 45.

As has been previously stated, one end of the motor shaft is rotatably supported by means of a bearing which is supported by the end bracket 38. The other end of the motor shaft is rotatably supported by means of bearing 52, which is mounted on the hub 53 of axially movable pulley section 13, and which is secured in axially adjustable bearing housing 45 by means of the bearing cap 54 and the shoulder 55 formed on the bearing housing. Bearing housing 45 and bearing cap 54 may be provided with appropriate lubricant retaining seals 56 and 57. Bearing 52 may be secured to the hub 53 by means of lock nut 58 and lock washer 59.

The position of axially adjustable pulley section 14 is interlocked with that of the adjustable pulley section 13 by means of threaded rods 60 and sleeves 61. Sleeves 61 project through apertures 62 formed in fixed pulley section 11 and abut against shoulders 63 and 64 formed respectively on the axially adjustable pulley sections 13 and 14. The pulley sections 13 and 14 may be securely held together by providing a sufficient number of the sleeves 61 and rods 60 spaced at equal angular positions. Each of the rods 60 is threaded into section 13 and is provided with a flat head 65 which holds the pulley section 14 against the end of the corresponding sleeve 61. A set screw 66 may be provided for each of the threaded rods to prevent the rotation of the threaded rods after they are in position. It is evident from the construction that pulley section 14 is rigidly interlocked with pulley section 13 by means of the rod and sleeve construction described. By the use of sleeves of different lengths the relative positions of pulley sections 13 and 14 may be varied.

The fixed pulley sections 11 and 12 may be suitably secured to the motor shaft by means of set screws 288 and 289. The pulley sections 11, 12, 13 and 14 may be suitably keyed to the driving shaft by means of key 67 which prevents the relative rotation of the pulley sections with respect to the shaft but which permits axial movement thereof.

It is thus obvious from the nature of the construction that a pivotal movement of the lever arm 48 results in an axial movement of the bearing housing 45 and the axially adjustable pulley sections 13 and 14, thereby simultaneously and interlockingly adjusting the effective diameter of the adjustable pulleys 9 and 10 formed by the pulley sections associated with the motor shaft.

In order to provide a free sliding movement between the axially adjustable pulley sections and the supporting shaft, the surface of the motor shaft 2 which supports the pulley sections is provided with a layer of wear and corrosion resisting material such as chromium plate and the hubs of the axially adjustable pulley sections 13 and 14 are provided with bushings 68 and 69 formed of lubricant retaining bearing material. Suitable means may be provided for conducting lubricant to the axially movable surfaces. In the present instance the bushings 68 and 69 in the hubs of pulley sections 13 and 14 have formed thereon annular grooves 70 and 71 at the shaft contacting surfaces. The annular grooves 70 and 71 are connected by lubricant conducting passages 72 and 73 with pressure lubricating fixtures 74 and 75, of the type commonly employed with pressure lubricators. Means are also provided for lubricating the fit formed between the axially adjustable bearing housing and the internal bore 44 of control housing 43. In the present instance the internal surface of bore 44 has the annular groove 76 formed thereon. Lubricant is conducted to the annular groove 76 by means of lubricating passages 77 formed in control housing 43. Bearing housing 45 has the axially extending groove 78 formed thereon, which by means of lubricant conducting aperture 79 conducts lubricant from the annular groove 76 to the lubricant retaining chamber 80, formed by the bearing housing. The lubricant retaining chamber 80 provides lubricant for the bearing 52 and the supporting surfaces of the movable pulley section 13.

To provide means for cooling the driving belt, the pulley sections have formed thereon the fan blades 285, which circulate air over the pulley sections. The pulley sections are also provided with a ring 286 of increased thickness, which may have countersunk holes 287 formed therein to dynamically balance the pulley section.

The means whereby the effective diameters of the adjustable pulley structures 9 and 10 are adjusted by a pivotal movement of the lever arm 48 has been disclosed. Consider now the means provided whereby the pivotal movement of this lever arm is interlocked with the adjustment of the center distance between the driving and driven pulley structures. For this purpose the sub-base has supported thereon the channel guide 81, which is angularly related with respect to the axis of the motor shaft, and which engages roller 82 mounted on the lever arm 48. If it is desired to increase the effective diameter of the driving pulley structure, then pulley sections 13 and 14, which are axially slidable with respect to the motor shaft, must be moved toward the pulley sections 11 and 12 which are fixed to the motor shaft. This necessitates the motion to the left of the pulley sections 13 and 14 as viewed in Figure 5 and a motion to the right of the pulley sections 11 and 12. The required motion of the adjustable pulley sections 13 and 14 will be provided by a movement to the left of roller 82 attached to lever arm 48, and the required motion of the pulley sections fixed to the motor shaft will be provided by a motion to the right of the motor shaft. An increase in the effective diameter of the driving pulley structure also requires that the axis of the motor shaft be moved toward the axis of the driven shaft. This motion may be provided by positioning the channel guide 81 as shown by the detailed view of the base in Figure 3.

In Figure 3 a movement of the sliding motor base toward the top of the sheet corresponds to a decrease in the center distance. As the center distance is decreased the angular guide 18 formed on the sub-base moves the sliding base 15 and the shaft of the motor supported thereby to the right. At the same time the channel guide 81 moves the roller 82, which is secured to the lever arm 48, towards the left. Thus as the center distance is decreased the opposite facing pulley sections of each of the adjustable pulley structures are made to approach each other at a substantially equal rate to maintain the belt in alignment.

The angular relation of the channel guide 81 to the motor shaft is dependent on the dimensions of the arm 48, on the diameters of the driving and driven pulleys, the center distance between the pulleys and the relative elevation of the two pulleys. As the center distance is variable and the pulley diameters are relatively adjustable, the required angle between the channel guide and the motor shaft is also a variable. If it is desired, the channel guide may be formed with changing curvature to provide the exact adjustment required. However, as in the case of the angular guide 18 an average value may be chosen for the angle of the channel guide such that the required adjustment is substantially provided throughout the range of the adjustable pulley structure. Due to the fact that the angular guide 18 is constructed to an average angle it is not possible to exactly satisfy the conditions of perfect belt alignment and constant belt tension. However, either one of these conditions may be exactly satisfied and the other substantially satisfied; or if it is desired, average values may be chosen such that both conditions are substantially satisfied. Thus the channel guide 81 may be so constructed that the pulley sections 13 and 14 are moved at the rate required to maintain the belt at a constant tension for all positions of the pulley structure; or the channel guide may be so constructed that the pulley sections 13 and 14 are moved at a rate exactly equal and opposite to that of the pulley sections 11 and 12, thereby maintaining the belt in perfect alignment; but not at an exactly constant tension. Or the channel guide may be so constructed that the belt is maintained almost in perfect alignment and almost at a constant tension. The particular construction chosen can be determined from a comparison of the errors which would be introduced. In a majority of installations it is, however, desirable to maintain the belt tension and allow a slight misalignment of the belt.

The dimensions of the belt and of the pulley sections of the adjustable pulley structure are a function of the mounting dimension and of the speed and power requirements at the load driving shaft. It is thus desirable to provide a variable speed mechanism which is readily adaptable to a wide range of speed and power requirements. The manner in which the base plate and the sub-base are constructed to provide means for adjusting the driving pulley structure with respect to the driven pulley structure has already been disclosed. It is, of course, possible to construct the entire variable speed drive to meet particular belt, pulleys and mounting dimensions. However, it is possible to adapt the variable speed drive to a wide range of operating conditions by providing means for adjusting the positions of the members of the variable speed drive to accommodate particular pulley, belt and mounting dimensions. If supplementary means are provided for adjusting the relative positions of the pulley sections of the adjustable pulley structures and for adjusting the position and the angle of the channel guide 81, then the entire unit may be adjusted to meet widely varying belt, pulley and mounting dimensions.

In the present instance the channel guide 81 is mounted on plate 83 which is in turn supported on the sub-base by arms 84 and 85. The channel guide is secured to the plate 83 by means of screws 86 and 87 which pass through slots 88 and 89 formed in the channel guide and which are threaded into the plate 83. The slots 88 and 89 provide means whereby the angle of the channel guide may be changed, or whereby the channel guide may be moved laterally to adjust the pulley sections 13 and 14 to belts of different widths, while the angular adjustment of the channel guide provides means for adjusting the pulley sections 13 and 14 in the manner required by the particular pulley diameters and center distance.

Figure 6:
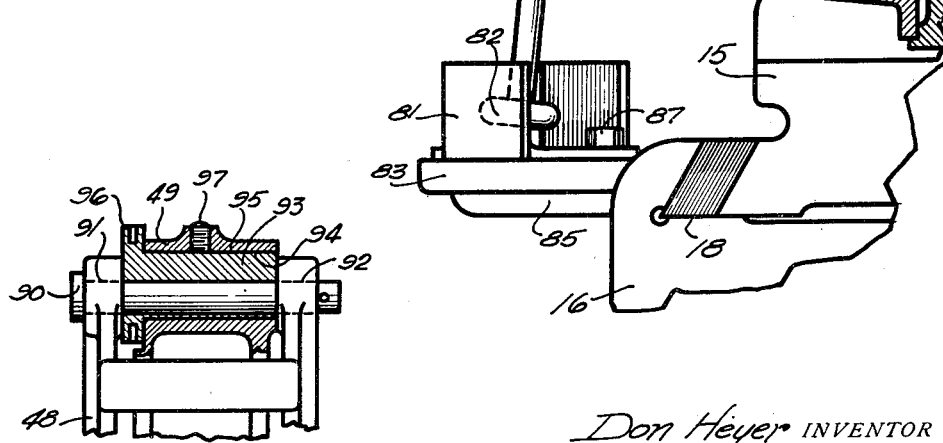
Figure 6 is a detailed view of the pivotal support provided for the pulley adjusting lever of Figure 5.

The channel guide may also be moved laterally to compensate for belt wear, however, in the present instance supplementary means are provided for this adjustment. As has been previously stated the lever arm 48 is pivotally mounted on the arm 49 of bracket 39. This pivotal support is formed by pin 90, Figure 6, which passes through apertures 91 and 92 formed in arm 48, and which is supported by bushing 93 secured to the extending arm 49. The bushing 93 has a cylindrical surface 94 formed thereon, which is eccentric with respect to pin 90. The external cylindrical surface 94 is supported by an internal cylindrical surface 95 formed on the arm 49. The flange 96 of the bushing may be suitably shaped to engage a wrench or have holes formed therein for a spanner wrench. The bushing may be secured to the arm 49 in any desired angular position by means of set screw 97. It is thus evident from the nature of the construction that a rotation of bushing 93 causes a pivotal movement of arm 48 about the roller 82, Figure 5, as a pivot, thus producing a reciprocating motion of bearing housing 45 and the pulley sections 13 and 14 actuated thereby. Thus as the belt wears or elongates the belt can be restored to its initial tension by advancing the pulley sections 13 and 14 toward the belt by means of a rotation of the bushing 93. Thus by means of the adjustment provided with the baseplate, the sub-base, the channel guide and the adjustable pulley structure it is possible to adapt the driving unit to widely varying operating conditions. It is to be noted that a slight variation in the speed ratio is produced when the belt wear is taken up by the supplementary adjustment of the pulley sections. This variation in speed ratio can be avoided if the belt wear is taken up by the adjustment of the sub-base with respect to the base plate by means of the lead screws 30 and 31, Figures 3 and 4.

The fixed pulley sections 11 and 12 also provide means whereby the driving pulley structure may be adjusted to accommodate belts of various widths or to compensate for variation in the widths of the driving belts of the multiple belt pulley structure. Thus if it is found that one of the belts is slightly shorter or of greater width and thereby tends to carry all the load the pulley section 12 can be moved away or towards the pulley section 14 until the load is equally divided between the belts 4 and 5; at which point the pulley section 12 may be secured to the motor shaft by means of the set screw provided for that purpose.

In the form of the adjustable speed drive illustrated by Figures 1 to 4 manual means have been provided for adjusting the speed ratio, however, the speed ratio may be automatically adjusted in accordance with the requirements of the driven load if automatic means are provided for adjusting the position of the sliding base in place of the hand wheel and lead screw mechanism illustrated by these drawings. Figure 7 illustrates a form of the drive in which the speed ratio is adjusting in synchronism with the driven load. In this form the sub-base 16 of Figures 1 to 4 is replaced by the sub-base 98, which except for the differences which will be noted may be of the same form as the sub-base 16. In the form of Figure 7 the threaded bushing 37 of Figures 3 and 4 is replaced by the cam follower roll 99, which is rotatably supported on pedestal 100, which in turn is secured to the sliding motor base 15. The roller 99 is maintained in contact with the cam 101 by means of helical compression spring 102. The helical spring 102 is centered and supported on bushing 103 which in turn is supported by removable cover plate 104 of the sub-base 98. To prevent buckling of the spring a rod 105 is provided which is threaded into pedestal 100 and which is slidably supported within the bushing 103, and has secured thereto the cylindrical bushing 106, which supports the inside of the helical spring but over which the helical spring is free to slide.

As the cam 101 is rotated the sliding motor base is moved back and forth at the rate determined by the cam surface. If means are provided for rotating the cam 101 in synchronism with the driven load it is, of course, obvious that the cam may be so designed that the required speed is provided at the load driving shaft of the variable ratio transmission, at any particular point of the speed cycle. The entire cam structure is supported on wall 107 of the sub-base by the removable supporting member 108. The supporting member 108 has an external cylindrical surface 109 formed thereon by means of which it is accurately located within a bore formed on the supporting wall. The supporting member is secured to the wall by means of bolts 110 which pass through flange 111 formed on the supporting member and which are threaded into the wall 107.

The cam 101 is rotatably supported by cam shaft 112 which is in turn supported by bearing bushing 113 of the supporting member 108. The cam shaft is restricted against axial movement in one direction by means of shoulder 114 which abuts against the end of the bearing bushing, and against axial movement in the opposite direction by means of the hub of cam 101 which abuts against the other end of the bearing bushing. The cam is secured to the cam shaft by means of lock nut 115 and is prevented from relative rotation by means of key 116.

The cam shaft 112 and the associated cam 101 may be driven by means of worm wheel 117 which is rotatably supported by shaft 118, in gear housing 119. The shaft 118 has a load driving extension 120 which projects into a cylindrical chamber formed in the end of the cam shaft 112. The driving connection between the load driving extension 120 and the cam shaft 112 is formed by means of key 121.

The gear housing 119 is provided with an external cylindrical surface 122 and which engages a mating surface formed on the supporting member 108, whereby the gear housing is accurately located with respect to the supporting member and the cam structure supported thereby. The gear housing is suitably secured to the flange 111 of the supporting member by means of bolt 123.

The worm wheel 117 is driven by worm 124 which is rotatably supported in the gear housing. The angle of the worm wheel may be made sufficiently small so that the worm effectively locks the worm wheel and the associated cam in the adjusted position.

Dual means are provided for driving the worm 124. The worm may be driven manually by means of a rotation of rod 125 which through bevel gearing drives the worm; or the worm may be driven automatically at the rate required by the driven machine 8 of Figures 1 and 2. In Figure 7 means are illustrated whereby the worm 124 may be driven in direct synchronism with the driven machine 8. In this form the worm is driven by shaft 126 of the driven machine. The shaft 126 may be driven by any desired member of the driven machine. If it is desired this shaft may be driven by the driven shaft 7 of the adjustable ratio transmission through suitable reduction gearing, or the shaft may be driven by any member of the driven machine which operates in synchronism with that member of the driven machine whose speed it is desired to control. The driving connection between the shaft 126 and worm 124 is formed by universal joints 127 and 128, coupling member 129, and shaft 130 and 131. The driving connection between shaft 131 and the worm 124 is formed through a uni-directional clutch which will be described in detail in connection with Figure 9.

The universal joints 127 and 128 and the coupling 129 provide means whereby the sub-base, which supports the motor, may be adjusted with respect to the driven machine 8. Coupling 129 is formed by the tubular member 132 into which the shaft 130 projects. The driving connection between the shaft 130 and the tubular member 132 is formed by means of pin 133 which is secured to the shaft 130 and which engages the slots 134 formed in the tubular member. The members 130 and 132 are thus free to move axially with respect to each other but are constrained to rotate together.

The sub-base 98 is provided with a removable cover 135 at the side of the base and the removable cover 136 at the end of the base, which provides access to the cam and the associated adjusting mechanism enclosed within the base. The threaded rod 137 is provided to aid in the installation or removal of the cam. The threaded rod 137 is supported by and threadedly engages the removable arm 138, which is in turn supported by the sub-base. When it is desired to remove the cam, the threaded rod may be rotated until it comes into contact with the sliding motor base 15 and urges the sliding motor base and the cam follower roll 99 away from the cam. The cam may then be removed through the apertures provided by removable cover plates 135 and 136 by the removal of lock nut 115. Or if it is desired the entire cam structure may be removed from the base together with the supporting member 108. Thus the removable covers 104, 135, 136 and the supporting member 108 provide means whereby the entire adjusting mechanism associated with the sliding base may be assembled or removed without removing the supported motor.

Figure 9:
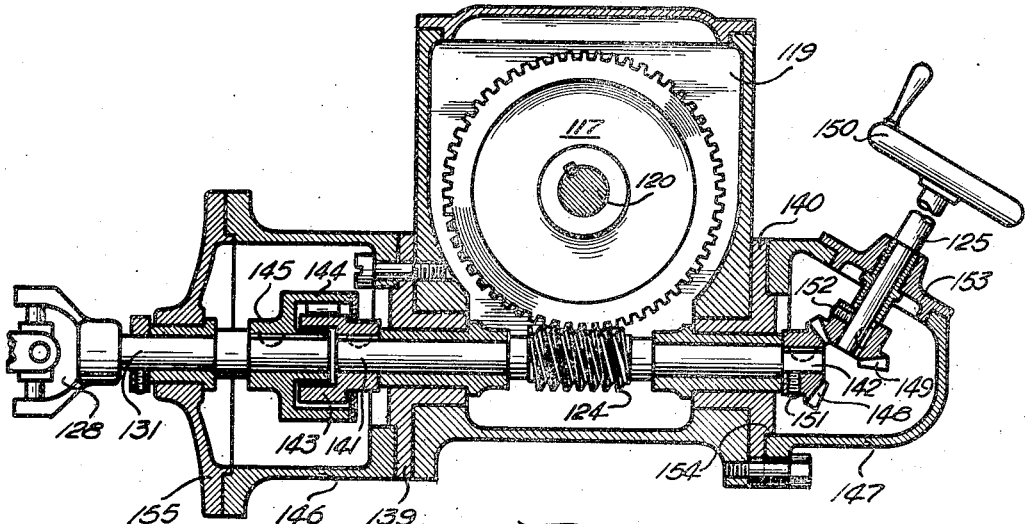
Figure 9 is a sectional view of the gear mechanism of Figure 7, provided for adjusting the motor base to adjust the speed ratio of the adjustable speed drive.

Figure 9 is the sectional view of the gear housing 119 of Figure 7 taken in a plane perpendicular to the axis of the cam shaft 112 and parallel to the axis of the worm 124. Referring to Figure 9: The worm is rotatably supported by the removable cover 139 and 140 and has the driving ends 141 and 142 projecting outside of the gear housing. The driving end 141 has keyed thereto the driven member 143 of the uni-directional clutch 144. The driving member 145 of the uni-directional clutch is keyed to the shaft 131. When the shaft 131 is driven by the shaft 126 of Figure 7, the uni-directional clutch 144 transmits the torque from the shaft 131 to the worm 124. However when the worm is driven by other means, and the member 143 of the clutch becomes the driving member and the member 145 becomes the driven member, the clutch allows these members to rotate with respect to each other thereby permitting a free rotation of the worm with respect to the shaft 131. Such uni-directional clutches are well known and need not be described in greater detail. The clutch 144 is enclosed by auxiliary housing member 146, which by means of removable cover 155 also rotatably supports the shaft 131.

The driving end 142 of the worm projects into the auxiliary gear housing 147, which is secured to the wall of the gear housing 119. The auxiliary gear housing encloses the bevel gears 148 and 149 which are in driving relation to each other, the bevel gear 148 being keyed to the end 142 of the worm and the bevel gear 149 being keyed to the rod 125, which is rotated by means of the hand wheel 150. The gears 148 and 149 may be suitably secured to their respective shafts by means of the set screws 151 and 152. Access to the gears is provided by the removable cover plate 153 of the gear housing, which also provides a bearing support for rod 125. The auxiliary gear housing 147 is located with respect to the gear housing 119 by means of a cylindrical surface 154 formed on the housing 147 and which engages a mating surface formed on the removable cover 140, which is in turn secured to the gear housing 119. Thus the auxiliary gear housing may be secured to the housing 119 in a plurality of angular positions. The rod 125 may also be of any desired length. It is thus possible to locate the hand wheel 150 at any desired angle or distance from the motor base and the motor supported thereby. If it is desired the bevel gears 148 and 149 may be replaced by a universal joint which will allow the rod 125 to assume a wide variety of positions with respect to the gear housing 119 and the associated mechanism.

The provision of the dual adjusting means is of particular utility in connection with loads which it is desirable to start at the lowest speed possible. Thus if the driven machine is of this nature and it is required to stop the driven machine at some point in the speed cycle, the speed of the driven machine may be adjusted to its minimum value by means of the hand wheel 150, at which point the driving motor may be stopped. After the motor is started again the speed may be rapidly adjusted by the hand wheel 150 to that point of the speed cycle at which the motor was operating before it was required to be stopped.

The automatic adjusting means of Figures 7 and 9 may be readily adapted to any type of load in which it is required to change the speed as the work progresses through the driven machine or in which the speed cycle is known and repeated. It is only necessary to employ some member for driving the shaft 126 which rotates in synchronism with that member of the driven machine whose speed it is desired to control, and then provide the proper gear ratio between the shaft 126 and the cam driving shaft 112; so that the period of rotation of the cam corresponds to that required by the driven load.

Figure 10:
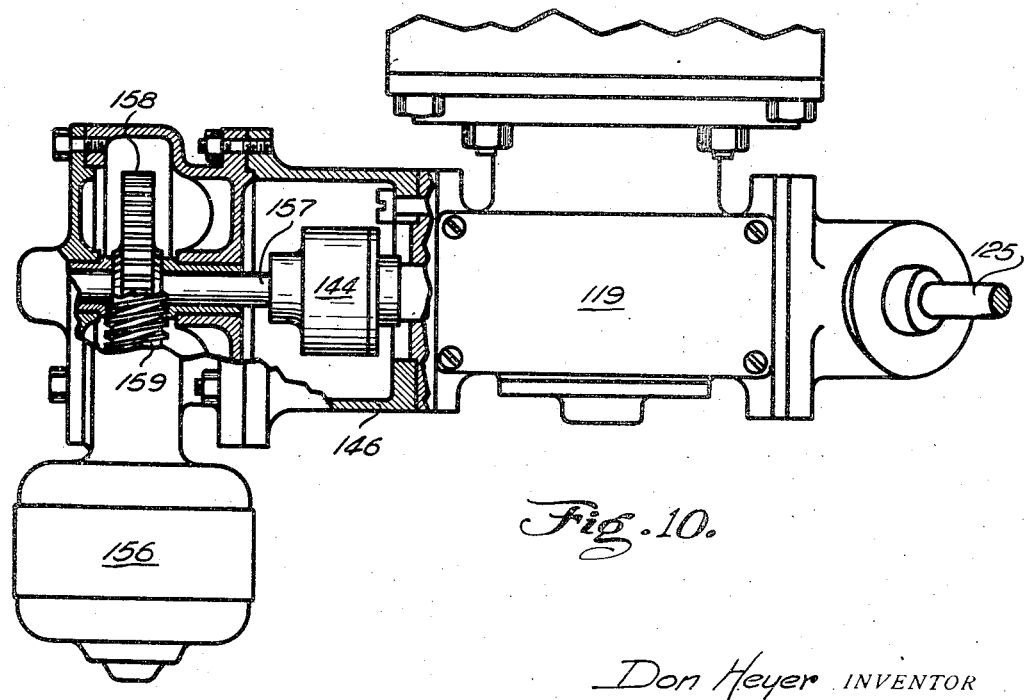
Figure 10 is a plan view of the gear mechanism of Figures 7 and 9, and illustrates the means provided for driving the gear mechanism by means of a geared electric speed control motor.

Figure 10 illustrates a form of automatic control in which the speed is adjusted at a predetermined rate. Figure 10 is a plan view of the gear housing 119 of Figures 7 and 9, with the shaft 131 and the associated driving structure replaced by a geared speed control motor. In the form of Figure 10 the auxiliary coupling housing 146 of Figures 7 and 9 has supported thereon the geared control motor 156. The uni-directional clutch 144 may again be employed to form the driving connection between the load driving shaft 157 of the geared control motor and the driving end of the worm. The geared control motor 156 may be of any desired form. The gear reduction may be obtained by the use of appropriate gearing between the motor shaft and the load driving shaft 157. In the present instance this gearing is shown as including the worm wheel 158 which is in driving relation to the load driving shaft and the worm 159 which is in driving relation to the worm wheel. In this form, as in that of Figures 7 and 9 the speed ratio may also be manually adjusted by the rotation of the hand wheel 150, which is in driving relation to the worm 124 and the cam structure driven thereby. When the speed ratio is manually adjusted the uni-directional clutch 144 allows the relative rotation of the worm and the load driving shaft 157 of the geared control motor. However, when the geared control motor is operated the clutch 144 transmits torque from the motor to the worm.

In many variable speed drives the speed cycle corresponds to the time required to finish an operation on a single piece or batch of material; after which it is desired to stop the machine and reload it. Under such conditions it is not desirable to have the cam 101 continuously repeat the speed cycle; but rather to have it stop at a given point at the time of completion of the work on the piece in the driven machine. For this purpose limit switches may be provided on the sub-base Figure 7 which may be wired into the control circuit of the geared control motor or of the main driving motor to stop either one or both of these motors at the desired point in the speed cycle. In the present instance limit switches are supported on the wall 160 of the sub-base adjacent to the removable cover 135, in such a manner that by the removal of the cover these switches will be accessible. The limit switches are actuated by means of fingers which are carried by arm 161, which is removably secured to the sliding motor base 15. The means by which these switches are actuated are illustrated by Figure 8 which is a view of the sub-base taken from the right of Figure 7, and with the removable cover 135 removed. Referring to Figure 8: The arm 161 has supported thereon the fingers 163, 164 and 165 which are threaded at one end and are respectively provided with lock nuts 166, 167 and 168 and the springs 169, 170 and 171. The fingers are slidably supported on bushings formed in the arm 161 and are urged away from the arm by means of the springs. Thus the length which the fingers project from the arm may be adjusted by means of the lock nuts provided for that purpose.

When the sliding motor base is moved by the cam towards the right to the desired limiting position the finger 165 comes into contact with the limit switch 172 and opens the contact which are normally maintained closed by the switch. The switch 172 may thus be wired into the circuit to form a stop button for the geared control motor or for the driving motor or for both the geared control motor and the driving motor, thus at the speed ratio corresponding to this position of the sliding base, further speed adjustment by the geared control motor may be stopped or the entire unit may be stopped.

A movement of the base towards the left is limited by the contact of finger 163 with limit switch 173. The limit switch 173 may also be wired into the control circuit to stop either the geared control motor or the entire unit. An additional holding contact 174 is provided which is actuated to the closed position by finger 164, just prior to actuation of limit switch 173. The holding contact 174 may be wired into the control circuit to provide supplementary means for adjusting the speed ratio prior to the time when the automatic control is again restored.

The arrangement of the limit switches illustrated by Figure 8 is of particular utility in connection with textile drives for spinning mills in which it is desired to control the speed of the spool on which the thread is spun. The speed of the spool is constantly increased throughout the spinning process until the spool is full, at which time the adjustable speed drive is adjusted to the slow speed position, and stopped, to allow the full spools to be replaced by empty ones. The operation is started with the motor base 15 at the extreme left or the low speed position. The sliding base is then moved continuously towards the right to increase the speed of the driven machine until the work is completed, at which time the finger 165 actuates the high speed limit switch 172, preventing any further increase in the speed of the driven machine. The time required for completing the work may be from 6 to 8 hours. Thus the cam 101 must be rotated very slowly. Consequently it is desirable to provide supplementary means whereby this cam may be rapidly rotated to return the sliding base from the high speed position to the low speed position. When the sliding motor base has been returned to the low speed position the finger 163 actuates the limit switch 173 to stop the entire unit, at which time the machine can be reloaded and the cycle repeated.

The control circuit for this operation is described in connection with Figure 11. Referring to this figure: Power is supplied to the driving motor by the power lines 175, 176 and 177, which are connected by magnetic switch 178 to the motor leads 179, 180 and 181 of the driving motor 1 of the variable speed drive. The magnetic switch 178 is actuated by means of the magnetizing coil 182, one side of which is connected by lead 183, to the power line 176 and the other side of which is connected through lead 184, stop button 185, start button 186 and lead 187 to power line 177. When the magnetic switch is closed the magnetizing coil 182 is connected to power line 177 through lead 184, stop button 185, lead 188, low speed limit switch 173, lead 189, switch contact 190, and lead 191. The motor leads 179 and 181 have the heater elements 192 and 193 of thermal relays 194 and 195 connected therein. The thermal relays 194 and 195 are connected into the holding circuit of the magnetizing coil 182 to provide overload protection for the motor. Thus by means of the control circuit of Figure 11, the driving motor is started by the actuation of start button 186 and may be stopped either by the actuation of stop button 185, the low speed limit switch 173, or of the thermal relays 194 and 195.

Power for driving the geared control motor and for the control circuit is provided by transformers 196 and 256, the primaries of the transformer being connected by leads 257, 197 and 198 to the motor leads 179, 180 and 181. The secondaries of the transformers are connected by leads 258, 199 and 200 and switch 201 to the low voltage busses 259, 202 and 203. In the control circuit of Figure 11 the geared control motor 156 of Figure 10 is indicated as a single phase repulsion induction motor, however it is to be understood that any type of motor can be used for the geared control motor, the speed of which does not change too rapidly for slight variations in load. The geared control motor 156 may be connected to low voltage busses 202 and 203 by means of the magnetic switches 204 or 205. Magnetic switch 204 is connected to low voltage busses 259, 202 and 203 by means of leads 264, 206 and 207. When the magnetic switch is closed the switch contacts 208 and 209 connect leads 206 and 207 respectively to the motor leads 210 and 211. Magnetic switch 204 is actuated by means of magnetizing coil 212, one side of which is connected to bus 202 by means of leads 206 and 213, and the other side of which is connected to bus 203 through lead 214, start button 215 and lead 216. Thus when start button 215 is pressed magnetizing coil 212 is energized to close switch 204. When the switch is closed, the magnetizing coil is connected to bus 203 through lead 217, switch contact 218, lead 219 and lead 207. Thus when the button 215 is pressed switch 204 remains closed until the sliding motor base is adjusted to the point at which the low speed limit switch 173 is opened thereby stopping the driving motor and the entire unit. Start button 215 may thus be used as a reset button to return the sliding motor base to the low speed position.

The magnetic switch 205 is connected to low voltage busses 259, 202 and 203 respectively by means of leads 266, 220 and 221. When the magnetic switch 205 is closed the leads 220 and 221 are connected by means of contacts 222 and 223 and leads 224 and 225 to the motor leads 210 and 211. The switch 205 is actuated by means of magnetizing coil 226, one side of which is connected to the low voltage bus 202 through leads 220 and 227, and the other side of which is connected to the low voltage bus 203 through lead 228, start button 229 and lead 216. It is to be noted that no holding contact is provided for the switch 205, thus the switch 205 remains closed only as long as the start button 229 is held closed. Thus the start button 229 forms a jog button for the geared control motor 156.

In many driven machines the time required for the completion of the speed cycle is dependent on the material on which the driven machine is operated. It thus becomes desirable to provide means whereby the rate of rotation of the cam 101 may be adjusted. This may be accomplished by changing the gear ratio between the geared control motor and the cam or by changing the speed at which the geared control motor operates. Although the gear ratio between the geared control motor and the cam may be chosen for a particular machine it is not convenient to change this gear ratio after it has been installed. It thus becomes advantageous to provide means whereby the rate at which the geared control motor drives the cam may be adjusted. If the time required for the completion of the speed cycle is relatively short so that an excessive gear reduction is not required between the geared control motor and the cam; then it is possible to employ a variable speed motor for the geared control motor and to operate this motor continuously during the speed cycle. The time required for the speed cycle may then be adjusted by adjusting the speed of the variable speed geared control motor. However, when the time required for the speed cycle is of great length then it is not advantageous to continuously operate the geared control motor to adjust the cam, as this would require an excessive gear reduction between the geared motor and the cam. The required adjustment of the cam can, however, be obtained by intermittently operating the geared control motor to adjust the cam by increments during successive intervals of time. The angle through which the cam is rotated during each adjusting period may be chosen sufficiently small so that no great fluctuation is produced in the speed of the driven machine. Thus if the cam is adjusted at uniformly spaced intervals, then it is possible to adjust the speed of rotation of the cam by adjusting the time during which the geared control motor operates during each of the adjusting periods.

In the present instance an intermittently operated, time controlled relay 231 is provided. This relay includes the synchronous driving motor 232, which through suitable reduction gearing drives the adjustable cam means 233. The cam 233 abruptly closes and opens the cam operated start button 234, the time during which the start button is closed being adjustable. The start button 234 will thus be closed for a predetermined time during each revolution of the cam means 233. Driving motor 232 of the relay may be a single phase synchronous motor of the type commonly employed for driving clocks.

The field 235 of the motor is connected to the low voltage busses 202 and 203 through switch 236, the switch 236 being normally held closed. The cam operated start button 234 controls the geared control motor by means of switch 205. When the cam operated start button is closed the circuit is completed to the magnetizing coil 226, of the magnetic switch 205 from the low voltage bus 202, by leads 220 and 227, and from bus 203 through switch 236, lead 237, cam operated start button 234, lead 238, high speed limit switch 172 and lead 239. Thus each time that start button 234 is closed, magnetic switch 205 connects the geared control motor to the low voltage busses 202 and 203. It is to be noted that the magnetic switch 205 remains closed only during the period for which the start button 234 remains closed. Thus the time during which the geared control motor is operated may be adjusted by adjusting the time during which the start button 234 is held closed.

Start button 174 of Figure 8 also acts to close the magnetic switch 205. Start button 174 connects one side of the magnetizing coil 226 of the switch to low voltage bus 203 through leads 230 and 240, the other side of the magnetizing coil being connected to the low voltage bus 202 through the leads 220 and 227.

For the purpose of indicating the period during which the magnetic switch 205 is closed to operate the geared control motor, an indicating lamp 241 is provided. One side of the lamp 241 is connected to the low voltage bus 202 by means of the lead 242 and the other side of the lamp is connected by the lead 228 to one side of the magnetizing coil 226 of the magnetic switch 205. It is to be noted that the other side of the magnetizing coil 226 is connected to the low voltage bus 202 by means of leads 220 and 227. Thus the lamp 241 is connected across the terminals of the magnetizing coil 226 so that when the magnetizing coil 226 is energized the lamp 241 is also energized. The lamp 241 thus indicates the time during which the geared control motor is operated to active position by means of the switch 205, when it is actuated by means of the start button 229, the start button 174; or by means of the cam operated start button 234. It is of particular utility to provide the lamp 241, as the time during which the cam means 233 maintains the start button 234 closed is adjustable. Thus by observing the lamp 241 it is possible to quickly determine the period during which the switch 205 is maintained closed.

Thus with the control circuit illustrated by Figure 11 the operation of the adjustable speed drive takes place in the following manner: The driving motor 1 may be started by pressing start button 186, which in addition to starting the driving motor also applies voltage to the low voltage busses 259, 202, 203. The synchronous driving motor 232 of the cam operated start button 234 is also started at the same time as the driving motor 1, the field 235 being connected to the busses 202 and 203. The geared control motor 156 being connected to the low voltage busses 202 and 203 by the magnetic switch 205, for a predetermined time during each revolution of the cam 233, the cam 101 of Figure 7 is rotated by increments to increase the speed ratio of the adjustable speed transmission until the speed of the driven shaft is adjusted to the speed corresponding to the position of the sliding motor base when it comes into contact with the high speed limit switch 172, Figure 8. The speed adjustment being interrupted by the limit switch 172, the driven machine continues to operate at the speed determined by the position of the sliding motor base when the high speed limit switch is actuated. At this point the start button 215 may be pressed to close the magnetic switch 204 which continuously operates the geared control motor 156 until the sliding motor base is returned to the position at which the start button 174 is pressed by means of the finger 164, carried by the sliding base. At this point switch 205 is closed by the actuation of start button 174. Thus the geared control motor 156 is connected to the low voltage busses 202 and 203 by means of both switches 205 and 204 until the sliding motor base moves to the position in which the low speed limit switch 173 is actuated by the finger 163. The low speed limit switch 173 operates to open magnetic switch 178 of the driving motor, thereby deenergizing the entire adjustable speed drive. The driven machine is thus automatically stopped at this point in the speed cycle.

The driving motor and the driven machine having been stopped by the actuation of the low speed limit switch 173, the driven machine may be reloaded. It is to be noted that the sliding motor base will stop in the position at which the low speed limit switch 173 is still held open. Thus when the start button 186 is pressed, to energize the motor, the circuit to the holding contact 190 of the switch 178 remains interrupted until the sliding motor base is adjusted to remove the finger 163 from the low speed limit switch 173. This, however, occurs rapidly as the start button 174 is also held closed by the finger 164. The geared control motor is thus connected to the low voltage busses 202 and 203 by means of the magnetic switch 205, thereby operating the geared control motor continuously until the sliding motor base is moved to the position at which finger 164 is removed from start button 174. At this point the adjustment of the speed ratio falls under the control of the cam operated relay 231.

The time during which the start button 186 must be held closed to remove the sliding motor base from the low speed limit switch 173 is only a matter of a few seconds and in no case need it be longer than the time required to remove the sliding motor base from the start button 174. The lamp 241 may thus serve to indicate this time. The start button 186 may be held closed until the lamp 241 is disconnected by the opening of start button 174. It is to be noted that the position at which the start button 174 and the high speed limit switch 172 are actuated by the sliding base may be adjusted. It is thus possible to adjust the limits over which the automatic control will be maintained.

Occasions occur in the operation of the driven machine when it is required to stop the driven machine in the middle of the speed cycle. In printing press drives and in the operation of other machines having a considerable inertia, it is desirable to start the machine at the lowest speed possible. Thus if it is found necessary to stop the machine in the middle of the speed cycle, the reset button 215 may be pressed which rapidly adjusts the drives to the low speed position, at which it is stopped by the low speed limit switch 173. When the machine is started it is desirable to rapidly adjust the speed ratio of the driven machine to the point at which it was operating before it was required to be stopped. This may be accomplished by pressing the start button 229 which maintains switch 205 closed as long as the start button is pressed. The start button 229 may be held closed until the speed ratio is adjusted to the desired value, at which time, upon the release of the start button 229, the time controlled relay 231 will resume control of the speed adjustment.

Figure 11:
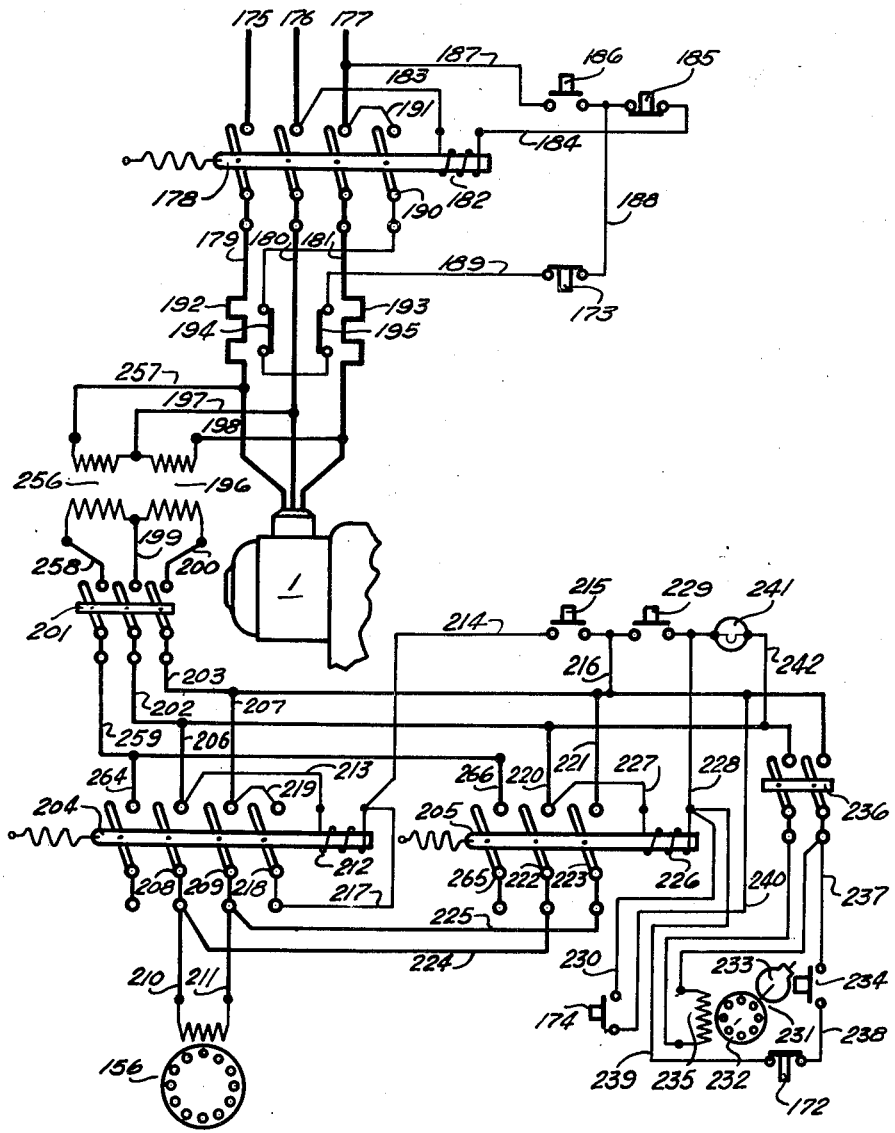
Figure 11 is a circuit diagram of the means provided for controlling the operation of the driving motor and of the geared control motor.

The speed control circuit illustrated by Figure 11 can be adapted to meet a wide variety of operating conditions. In drives in which it is desired to continuously repeat the speed cycle without stopping the driving motor, the fingers 163, 164 and 165 which operate the limit switches 172 and 173 and the start button 174 may be so adjusted that these limit switches are beyond the reach of the fingers. Thus the limit switches will not be actuated unless due to some unusual circumstance the adjustment of the sliding motor base is carried beyond its normal range. Under this condition of operation the limit switch 173 may also be employed to stop the driving motor, when the speed ratio is adjusted in direct synchronism with the driven machine by means of the drive connected with shaft 126 of Figures 7 and 9.

In drives in which it is desired to complete the speed cycle only once before reloading the driven machine, and in which it is desired to employ an automatic control throughout the speed cycle, means need to be provided for stopping the sliding motor base at only one point of the speed cycle. If it is desired to stop the driving motor when the speed cycle is completed, the limit switch 173 may be employed to stop the driving motor at the desired point in the speed cycle. Under this condition of operation the limit switch 173 may also be employed when the speed adjustment is actuated by the shaft 126 of the driven machine. If it is desired to stop the automatic speed control, but not the driving motor, the limit switch 172 may be employed and located at the proper point with respect to the sliding motor base, so that the operation of the automatic control is interrupted at the desired point in the speed cycle.

In drives in which it is desired to continuously operate the geared control motor 156, the cam operated relay 231 may be omitted or disconnected from the circuit by means of the switch 236. Under such conditions the limit switch 173 and the start button 174 may or may not be employed depending on the particular conditions of operation. Under this condition of operation when the driving motor is started the speed ratio may be adjusted to the desired starting value by means of the start button 229, after which, the button 215 may be pressed to connect the geared control motor to the low voltage busses through the switch 204. This switch remains closed and the geared control motor operates continuously to repeat the speed cycle until the stop button 185 of the driving motor is pressed.

The flexibility of the speed control provided by this construction is obvious. The particular type of speed time curve may be varied by using cams of different shapes for the speed ratio adjusting cam 101. The minimum time required to complete the speed cycle can be determined by the choice of proper gearing between the geared control motor 156 and the cam 101. The time required to complete the speed cycle can be adjusted by means of the time controlled cam operated relay 231. The drive may be adjusted to any desired speed ratio independent of the automatic means by means of the start button 229; or it may be manually adjusted to the desired speed ratio by means of the hand wheel 150 and the associated adjusting mechanism described in connection with Figures 7, 9 and 10. The speed ratio may be manually adjusted to the starting value by hand wheel 150, or the speed ratio may be rapidly adjusted to the starting value by the actuation of the start button 215.

Figure 12:
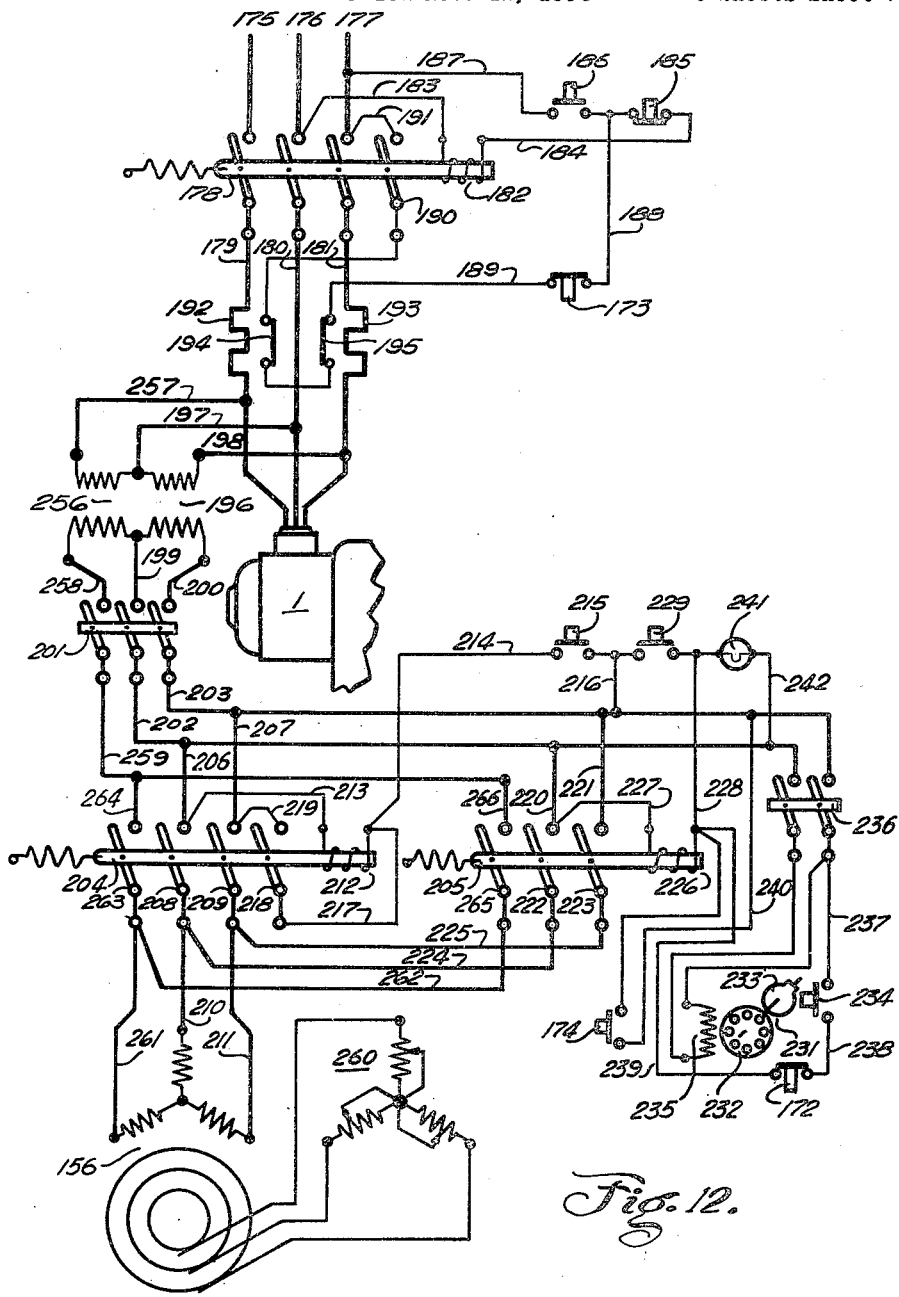
Figure 12 illustrates a modified form of the control circuit of Figure 11.

The control circuit of Figure 11 has been described in connection with a single phase motor for the geared control motor 156. However, it is to be understood that other types of motors may be used for this purpose without departing from the invention. Figure 12 illustrates another form of the control circuit of Figure 11, in which the geared control motor 156 is illustrated as a three phase induction motor having a wound rotor and the three phase adjustable resistance 260, whereby the speed of the motor may be adjusted. The motor is connected by the motor leads 261, 210 and 211 to the switch 204, and by the leads 262, 224, and 225 to the switch 205. Switch 204 connects the motor leads to the three phase low voltage busses 259, 202 and 203 through the switch contacts 263, 208, and 209 and leads 264, 206 and 207. The switch 205 connects the geared control motor to the three phase low voltage busses through the motor leads 261, 210 and 211 the leads 262, 224 and 225, the switch contacts 265, 222 and 223, and the leads 266, 220 and 221.

The switches 178, 204 and 205 may be actuated by the start buttons, the stop buttons, and the limit switches in the same manner as they are in the control circuit of Figure 11. However, with the control circuit of Figure 12, the time required to complete the speed cycle may be adjusted by adjusting the speed of the geared control motor, as well as by adjusting the time of operation of the cam operated start button 234. The control circuit of Figure 12 is of particular utility when it is desired to operate the geared control motor continuously, and when it is also desired to adjust the time required to complete the speed cycle.

Figures 13, 14:
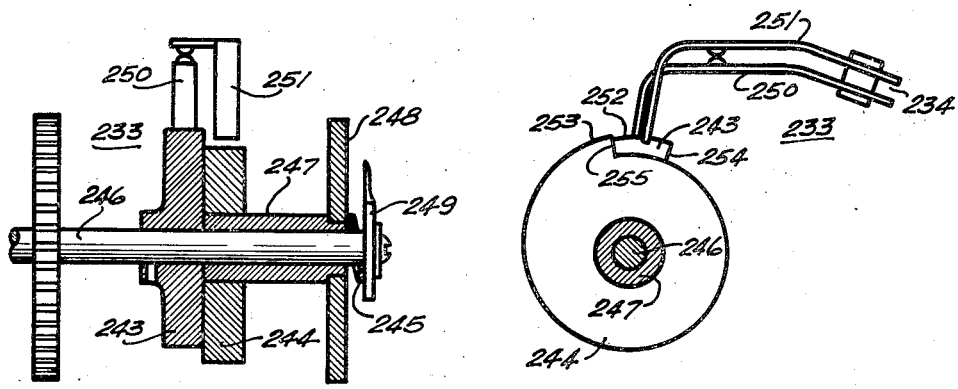
Figures 13 and 14 are detailed views of the cam operated, time controlled, relay employed in the control circuits of Figures 11 and 12.

Figures 13 and 14 are detailed views of the cam means of the timed controlled, cam operated, relay 231. Referring to Figure 13 the cam means 233 include the two cams 243 and 244. Cam 243 is secured directly to the shaft 246 which is driven through suitable reduction gearing by the synchronous motor 232 of Figure 11. Cam 244 is not fastened to shaft 246 but is provided with a hub 247, to which is secured the circular disc 248. Shaft 246 extends through hub 247 and has a pointer 249 fastened thereto. A short compression spring 245 is interposed between disc 248 and pointer 249, thereby urging cam 244 into frictional engagement with cam 243. This frictional force will be sufficient to rotate cam 244 together with cam 243. However, the cams may be relatively shifted by manually rotating disc 248 and the associated cam 244.

The cams 243 and 244 respectively have flexible spring contactors 250 and 251 which follow the cams. However, spring contactor 251 of cam 244 is constructed so that it will be supported by contactor 250 when it is not in contact with the cam. Contactors 250 and 251 are thus only in contact when contactor 251 is not supported by cam 244, the cams being formed of insulating material.

The start button formed by contactors 250 and 251 has been indicated by the numeral 234 in Figure 11.

The time during which the contactors are in contact can be adjusted by adjusting the relative angular position of cam 243 and 244. To indicate the time of contact disc 248 may be provided with a suitable scale on which pointer 249 indicates the time.

Cams 243 and 244 are constructed to provide a sudden closing and opening of the contact. This construction is illustrated by Figure 14, which is a view of the cams from the right hand side of Figure 13. Cams 243 and 244 are respectively formed with gradually rising surfaces 252 and 253 and undercut falling surfaces 254 and 255. When the cam 244 has rotated to the end of the rising surface 253 the flexible contactor 251 suddenly falls past the undercut surface 255 and comes into contact with the contactor 250, contactor 250 being supported on the rising surface 252 of cam 243. Contactors 50 and 251 remain in contact until contactor 250 comes to the end of the rising surface 252, at which time, contactor 250 suddenly falls past the undercut surface 254 and again into contact with the rising surface 252. Contactor 251 likewise comes into contact with the rising surface 253, thereby breaking the contact between these two contactors.

It is thus seen that the contact is suddenly made broken and that the time of contact is dependent on the rate of rotation of the cams and on the angular distance between the undercut surfaces 254 and 255. This angular distance can be adjusted by the relative rotation of the cams as has been previously described. The desired time for each revolution of the cam can be obtained by appropriate gearing between the driving synchronous motor and the shaft 246, on which the cams are mounted.

Figure 15:
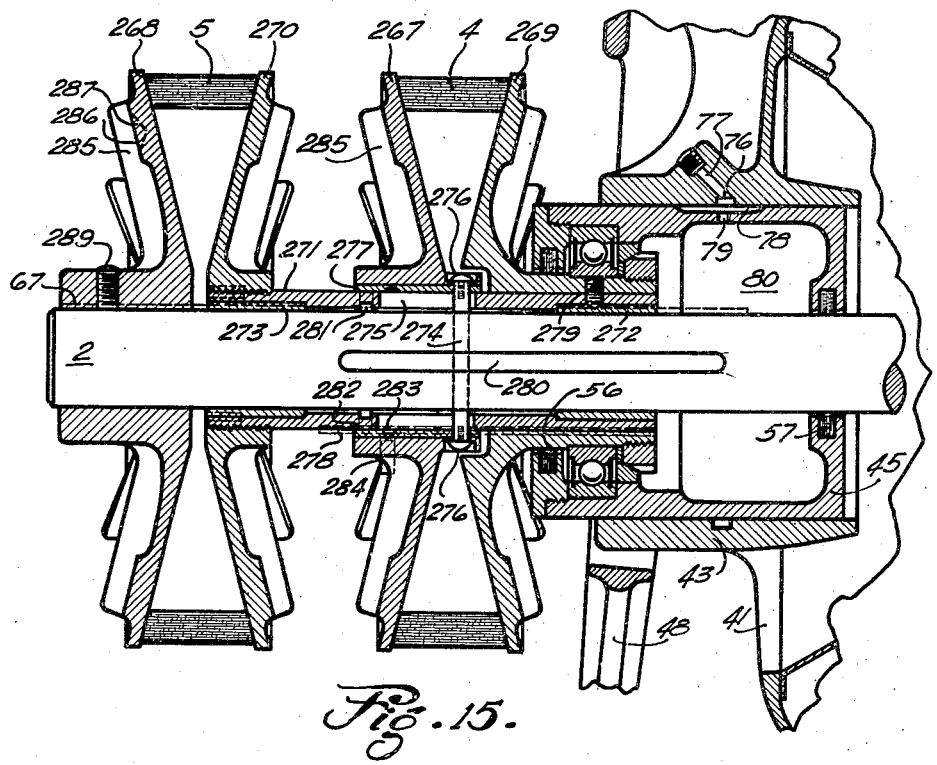
Figure 15 is another form of the multiple belt adjustable pulley structure of Figure 5.

Figure 15 illustrates an alternate form of the adjustable diameter driving pulley structure of Figure 5. In this form the pulley sections 11, 12, 13 and 14 are respectively replaced by the pulley sections 267, 268, 269 and 270 which may be of the same form as the pulley sections of Figure 5 except for the difference which will be noted. The pulley sections 269 and 270 are secured to and supported by the steel sleeve 271, which in turn is provided with the bearing bushings 272 and 273 whereby it is supported on the motor shaft. Sleeve 271 is pinned to pulley section 269 by pin 279 and is threaded into pulley section 270. The bearing bushings may be formed of lubricant retaining material, and the steel sleeve 271 may be relieved so that the only contact with the shaft is made by the bearing bushings.

The sleeve 271 and the pulley section 268 are keyed to the motor shaft by key 67, the pulley section 268 being secured to the shaft by set screw 289. It is obvious from the construction that the positions of the pulley sections 269 and 270 are interlocked by the sleeve 271, so that an axial movement of the adjustable bearing housing 45 results in a corresponding axial movement of the pulley sections.

The pulley section 267 is secured to the motor shaft by the pin 274, the sleeve 271 being provided with the slot 275 to permit the relative movement of the pin and sleeve. The pin 274 is threaded at each end and is provided with the wide headed screws 276, which engage the hub of the pulley section 267 and which are threaded into the pin to prevent radial movement of the pin. The pulley section 267 is provided with a bearing bushing 277 which supports the pulley section on the exterior surface of sleeve 271. Pulley section 267 is keyed to sleeve 271 by key 278, which also engages pulley section 269.

The surfaces of the motor shaft and of sleeve 271, which slidably support the pulley sections, are provided with a coating of wear and corrosion resisting material in the same manner as in the construction of Figure 5.

The motor shaft is provided with a lubricant conducting groove 280, which conducts lubricant from the lubricant retaining chamber 80 to the pulley supporting surfaces. The groove 280 may be angularly displaced from the slots 275 to prevent escape of the lubricant. The sleeve 271 is provided with an annular groove 281 for distributing lubricant over the shaft surface. The sleeve 271 is also provided with apertures 282 for conducting lubricant to the bearing bushing 277 of pulley section 267, the bushing 277, being provided with the annular groove 283. The pulley section 267 is also provided with the pressure lubricating fixture 284 for injecting lubricant to the annular groove 283. It is to be noted that by means of the construction of Figure 15, lubricant can be injected to all of the pulley supporting surfaces, during the active rotation of the motor shaft, through the lubricating passages 76, 77, 78 and 79 and the lubricant retaining chamber 80.

I claim:

1. In a multiple belt adjustable speed drive having a plurality of belts in active driving relation to a pair of multiple belt pulleys, one of said multiple belt pulleys including a plurality of coaxial adjustable diameter pulley structures, each of said pulley structures having a pair of pulley sections with opposed inclined faces forming by relative axial adjustment variable effective pulley diameters, and the center distance between the axes of said multiple belt pulleys being adjustable, the combination therewith of means for adjusting the center distance between the axes of said pulleys and for adjusting the relative axial position of the pulley sections forming each of said adjustable pulley structures, and supplementary means for simultaneously adjusting the relative axial position of the pulley sections of each of said adjustable pulley structures to accommodate belts of various widths.

2. In a multiple belt adjustable speed drive having a plurality of belts in active driving relation to a pair of multiple belt pulleys, one of said multiple belt pulleys including a plurality of coaxial adjustable diameter pulley structures, and the center distance between the axes of said multiple belt pulleys being adjustable, the combination therewith of means for adjusting the center distance between the axes of said pulleys and for adjusting the effective diameter of each of said adjustable pulley structures, and supplementary means for adjusting the relation of said pulley diameter adjusting means with respect to said center distance adjusting means to accommodate particular belt pulley and mounting dimensions.

3. In a multiple belt adjustable speed drive having a plurality of belts in active driving relation to a pair of multiple belt pulleys, one of said multiple belt pulleys including a plurality of coaxial adjustable diameter pulley structures and the center distance between the axes of said multiple belt pulleys being adjustable, the combination therewith of means for adjusting the center distance between the axes of said pulleys and for adjusting the effective diameter of each of said adjustable pulley structures and supplementary means for adjusting the axial position of said pulley sections to equalize the load on the belts of the multiple belt drive.

4. In an adjustable speed drive having a belt in active driving relation to a pair of pulley structures, one of said pulley structures having an adjustable effective diameter, and the center distance between the axes of said pulley structures being variable, the combination therewith of means forming an adjustable support for one of said pulley structures, said adjustable support providing means for adjusting the center distance between the axes of said pulley structures in accordance with the adjustment of the effective diameter of said adjustable pulley structure, and supplementary means for adjusting said adjustable support to vary the relative axial position of said pair of pulley structures to bring said belt into substantial alignment.

5. In an adjustable speed drive having a belt in active driving relation to a pair of pulley structures, one of said pulley structures having an adjustable effective diameter, and the center distance between the axes of said pulley structures being variable, the combination therewith of means forming an adjustable support for one of said pulley structures, said adjustable support providing means for adjusting the center distance between the axes of said pulley structures in accordance with the adjustment of the effective diameter of said adjustable pulley structure, and supplementary means for adjusting said adjustable support to vary the relative axial position of said pair of pulley structures to adjust the belt alignment and for adjusting the center distance between the axes of said pulley structures to adjust the belt tension.

6. In an adjustable speed drive having a belt in active driving relation to a pair of pulley structures, one of said pulley structures having an adjustable effective diameter and including a pair of pulley sections with opposed inclined faces, forming by relative axial adjustment variable effective pulley diameter, the center distance between the axes of said pulley structures being variable, the combination therewith of interlocking means for adjusting the center distance between the axes of said pulley structure and for adjusting the axial position of said pulley sections by substantially equal and opposite amounts with respect to said driving belt, and supplementary means for adjusting the center distance between the axes of said pulleys and for adjusting the relative axial position of said pulley structures to adjust the belt tension and belt alignment.

7. In an adjustable speed drive having a belt in active driving relation to a pair of pulley structures, one of said pulley structures having an adjustable effective diameter, the combination therewith of interlocking means for adjusting the center distance between the axes of said pulley structures and for adjusting the effective diameter of said adjustable pulley structure, and supplementary means for adjusting the center distance between the axes of said pulleys and for adjusting the relative axial position of said pulley structures to adjust the belt tension and belt alignment.

8. In a multiple belt adjustable speed drive, a driving shaft, a driven shaft, a pair of multiple belt pulleys in respective axial driving relation to each of said shafts, a plurality of belts for transmitting power between said pulleys, one of said multiple belt pulleys having an adjustable effective diameter and including a plurality of coaxial adjustable diameter pulley structures, each of said pulley structures having a pulley section axially fixed with respect to its shaft and a pulley section axially adjustable with respect to the fixed pulley section, said pulley sections having opposed inclined faces, forming by relative axial adjustment variable effective pulley diameters, means for adjusting the center distance between the axes of said multiple belt pulleys, and means interlocked with said center distance adjusting means for simultaneously adjusting the axial positions of said axially adjustable pulley sections.

9. In a device of the character described, a driving shaft, a driven shaft, a pair of pulley structures, respectively in driving relation to said shafts, one of said pulley structures having a pair of relatively axially adjustable sections with opposed inclined faces, forming by relative axial adjustment, variable pulley diameters, an edge-active belt connecting said structures, and means for adjusting the ratio of the drive, by varying the center distance between the shafts, comprising a movable cam to cause an adjustment of one of the structures, and power means for causing the cam to move in cyclic increments.

10. In a device of the character described, a driving shaft, a driven shaft, a pair of pulley structures respectively in driving relation to said shafts, one of said pulley structures having a pair of relatively axially adjustable sections with opposed inclined faces, forming by relative axial adjustment, variable pulley diameters, an edge-active belt connecting said structures, and means for adjusting the ratio of the drive, comprising an electric motor, and a control for the motor to operate said adjusting means optionally either continuously or in cyclic periods.

11. In a variable diameter pulley structure, a shaft, a pair of pulley sections having opposed inclined faces, mounted on said shaft, and forming by relative axial adjustment, variable effective pulley diameters, a lever pivoted at one end for adjusting at least one of the pulley sections, and means for adjusting the position of the pivot of the lever.

12. In a variable diameter pulley structure, a shaft, a pair of pulley sections having opposed inclined faces, mounted on said shaft, and forming by relative axial adjustment, variable effective pulley diameters, a lever pivoted at one end for adjusting at least one of the pulley sections, and means for adjusting the position of the pivot of the lever, comprising an eccentrically mounted pivot support for the lever.

DON HEYER.